United States Patent [19]
Kobayashi et al.

[11] Patent Number: 5,408,388
[45] Date of Patent: Apr. 18, 1995

[54] PLANAR ILLUMINATING DEVICE

[75] Inventors: Uruo Kobayashi, Tokyo; Yoji Oki, Yokohama; Nobuo Matsui, Yokohama; Yoshinori Go, Yokohama, all of Japan

[73] Assignee: Stanley Electric Co., Ltd., Tokyo, Japan

[21] Appl. No.: 9,208

[22] Filed: Jan. 22, 1993

[30] Foreign Application Priority Data

Jan. 24, 1992 [JP] Japan .................................. 4-032951

[51] Int. Cl.⁶ .............................................. F21V 8/00
[52] U.S. Cl. ...................................... 362/31; 362/26; 362/27; 362/331
[58] Field of Search ..................... 362/26, 27, 29, 30, 362/31, 326, 327, 328, 330, 331, 339, 223

[56] References Cited

U.S. PATENT DOCUMENTS

| | | | |
|---|---|---|---|
| 4,233,651 | 11/1980 | Fabbri | 362/330 |
| 4,242,723 | 12/1980 | Fabbri et al. | 362/31 |
| 4,257,084 | 3/1981 | Reynolds | 362/26 |
| 4,277,817 | 7/1981 | Hehr | 362/31 |
| 4,791,540 | 12/1988 | Dreyer et al. | 362/331 |
| 4,792,884 | 12/1988 | Suman et al. | 362/31 |
| 4,975,807 | 12/1990 | Ohashi | 362/26 |
| 5,050,946 | 9/1991 | Hathaway et al. | 362/31 |
| 5,178,447 | 1/1993 | Murase et al. | 362/31 |

FOREIGN PATENT DOCUMENTS

| | | | |
|---|---|---|---|
| 30346 | 5/1926 | France | 362/31 |
| 475508 | 8/1969 | Switzerland | 362/327 |

*Primary Examiner*—Ira S. Lazarus
*Assistant Examiner*—Y. Quach
*Attorney, Agent, or Firm*—Louis Weinstein

[57] ABSTRACT

A planar illuminating device, comprising a light-transmitting plate made of a transparent material and having opposite side edges and opposing front and rear faces, two sources of light each arranged adjacent to one of the side edges of the plate, a reflector arranged behind the plate rear face and reflecting rays of light from the plate to the front face of the plate, a light diffuser arranged in front of the plate and diffusing rays of light from the plate. The device comprises a reflecting finish applied directly to the rear face of the plate. A reflecting surface of the reflecting finish faces substantially in the direction of the front face of the plate. The reflectance of part of the reflecting finish depends on the distance of that part from either of the two sources of light. The device further comprises parallel prismatic cuts along the front face of the plate. The longitudinal axes of the prismatic cuts are substantially parallel to rays of light passing from the sources of light through the plate. A combination of the reflecting finish and the reflector increases the surface illuminance and the uniformity in the surface illuminance of the planar illuminating device.

11 Claims, 5 Drawing Sheets

PLANAR ILLUMINATING DEVICE

BACKGROUND OF THE INVENTION

1. Field of the Invention

The present invention relates to a planar illuminating device used as a back light for liquid crystal displays of portable office automation apparatuses such as a word processor or a personal computer.

2. Background Art

Figure 7:
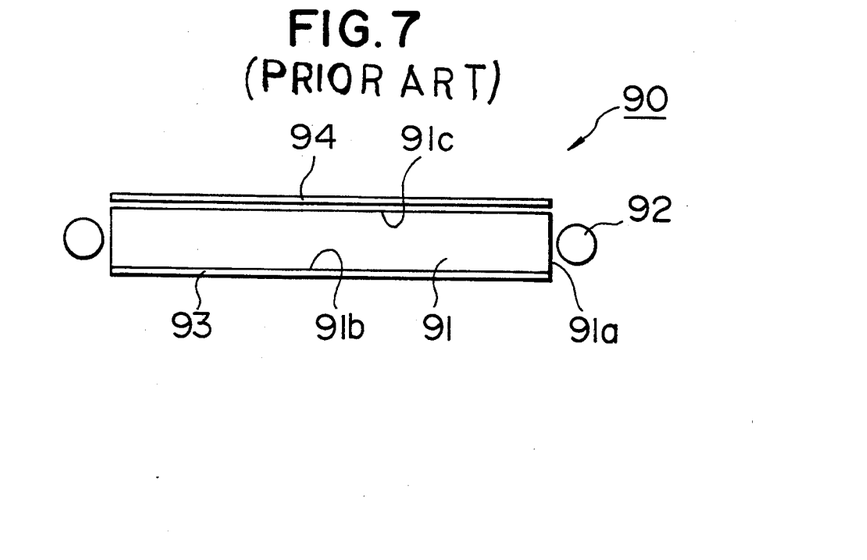
FIG. 7 is a cross section of a prior art planar illuminating device.

FIG. 7 illustrates an arrangement of such a conventional planar illuminating device 90. The planar illuminating device 90 comprises a rectangular flat light transmitting plate 91, two sources of light 92, 92 a flat light reflecting sheet 93 and a light diffusing sheet 94. The light transmitting plate 91 is made of a high-transparent material, such as acrylic resin, in the form of a thick plate. The sources of light 92 comprise, e.g., tubular fluorescent lamps and are arranged adjacent to the surfaces 91a, 91a of opposite side edges of the light transmitting plate 91. The light reflecting sheet 93 has the same shape as the light transmitting plate 91, is attached to and covers the entire rear surface of the light transmitting plate 91. The light reflecting sheet 93 has, e.g., a white reflecting front surface having a suitable diffusing force or diffusivity. The light diffusing sheet 94 has the same shape as the light transmitting plate 91 and a milky color and covers the entire front surface of the light transmitting plate 91 with a suitable clearance therebetween.

In the operation of the light transmitting plate 91, portions of rays of light from the sources of light 92 incident upon the edge surface 91c of the light transmitting plate 91 which has an angle of incidence less than a critical angle of incidence (approximately 45°) is reflected by the front surface 91c due to a difference of the indices of refraction of the light transmitting plate 91 and the air to travel to the light reflecting sheet 93 and be reflected again by the light reflecting sheet 93 to the front surface 91c.

Since the light reflecting sheet 93 has a the suitable diffusivity, rays of light reflected from the light reflecting sheet 93 to the front surface 91c involve rays of light of the critical angle or more which pass through the front surface 91c and the light diffusing sheet 94 to illuminate the light diffusing sheet 94. Thus, the light transmitting plate 91 illuminates the entire light diffusing sheet 94 to illuminate the entire liquid crystal display (not shown) with the planar illuminating device 90 from behind the display even if part of the light diffusing sheet 94 is remote from the sources of light 92.

However, the planar illuminating device 90 involves a drawback that direct rays of light from the sources of light 92 more intensively illuminate part of the light transmitting plate 91 near the edge surfaces 91a of the light transmitting plate 91 opposite to the sources of light 92 than the other part of the light transmitting plate 91 to produce such nonuniformity in the illumination of that the illuminance of part of the light diffusing sheet 94 is as small as that part is remote from the sources of light 92.

Figure 8:
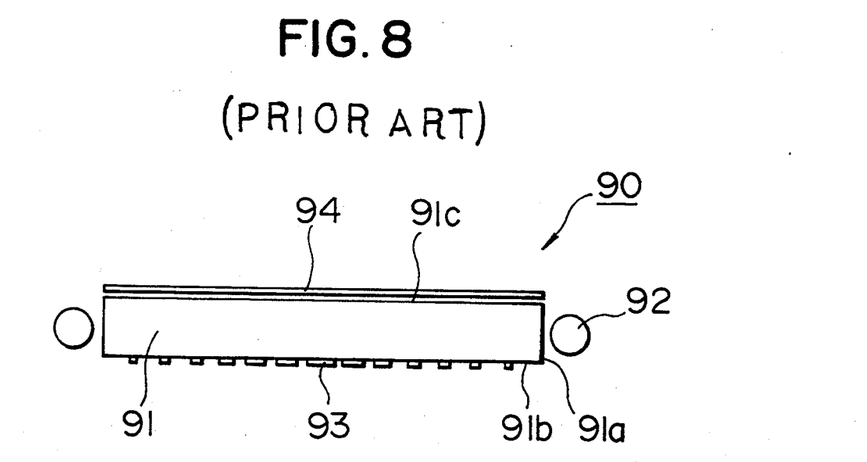
FIG. 8 is a cross section of a prior art planar illuminating device.

In order to eliminate the above-described drawback, there was proposed a planar illuminating device in which the rear surface 91b of the light transmitting plate 91 has, e.g., a large number of spot-shaped reflecting layers 93 attached thereto and the area of part of the rear surface 91b occupied by the spot-shaped reflecting layers 93 is such that the size of a spot is directly proportional to the distance of a spot from the nearest edge surface 91a, i.e. the size of spots close to the nearest end is smaller in size than a spot further away from its nearest edge surface, as shown in FIG. 8. This arrangement involves a new drawback that the surface illuminance of the entire light diffusing sheet 94 is equalized to that of the darkest part of the light diffusing sheet 94 to reduce efficiency of the entire planar illuminating device. Therefore, measures for eliminating both the drawbacks have been desired but not achieved prior to the present invention.

SUMMARY OF THE INVENTION

Therefore, a primary object of the present invention is to provide a planar illuminating device having an increased illuminance.

In order to achieve this object, a planar illuminating device of a first aspect of the present invention comprises a light-transmitting plate made of a transparent material and having opposite side edges, two sources of light arranged adjacent to the side edges of the light transmitting plate, a reflector arranged behind the light transmitting plate for reflecting rays of light from the light transmitting plate to the front of the light transmitting plate, a light diffuser arranged in front of the light transmitting plate and diffusing rays of light from the light transmitting plate, a reflecting finish applied directly to the rear surface of the light transmitting plate, a reflecting surface of the reflecting finish for reflecting light substantially in a direction toward the front of the light transmitting plate, the reflectance of part of the reflecting finish varying in direct proportion to the distance of the reflective surface from the closer of the two sources of light, and parallel prismatic cuts on the front surface of the light transmitting plate, the longitudinal axes of the prismatic cuts being substantially parallel to rays of light passing from the sources of light through the light transmitting plate.

The prismatic cuts may be a knurled or hairline finish.

The reflecting finish of the planar illuminating device of the first aspect of the present invention may comprise an assembly of spot-shaped layers applied to the rear surface of the light transmitting plate. The spot-shaped layers have a higher reflectance than the reflector. The size of a spot-shaped layer is in direct proportion to the distance of the spot-shaped layer from the nearer sources of light.

The reflecting finish of the planar illuminating device of the first aspect of the present invention may alternatively comprise a satin finish on the rear surface of the light transmitting plate, and an assembly of spot-shaped layers made of a transparent paint applied to the satin finish. The area of part of the satin finish occupied by a spot-shaped layer is as small as that part is remote from the sources of light i.e., the size of each satin finish is inversely proportion to the distance of each satin finish from the nearest light source.

A further object of the present invention is to provide a planar illuminating device having an increased uniformity in surface illumination.

In order to achieve this object, a planar illuminating device of a second aspect of the present invention comprises in addition to the planar illuminating device of the first aspect of the present invention the reflecting finish comprising an assembly of spot-shaped layers applied to the rear surface of the light transmitting plate, the spot-shaped layers having a higher reflectance than the reflector, the area of part of the rear surface of the light transmitting plate occupied by a spot-shaped layer being as large as that part is remote from the sources of light, the rear portion of the light transmitting plate having a tapering portion tapering in the thickness from the sources of light.

The reflecting finish of the planar illuminating device of the second aspect of the present invention may alternatively comprise a satin finish on the rear surface of the light transmitting plate, and an assembly of spot-shaped layers made of a transparent paint applied to the satin finish. The area of part of this satin finish occupied by a spot-shaped layer is as small as that part is remote from the sources of light.

In order to achieve the further object, the planar illuminating device of the second aspect of the present invention may further comprise a prismatic sheet made of the same material as the light transmitting plate and arranged between the light transmitting plate and the light diffuser. The front surface of the prismatic sheet has substantially the same prismatic cuts as the front surface of the light transmitting plate. The longitudinal axes of the prismatic cuts of the prismatic sheet are transverse to the longitudinal axes of the prismatic cuts of the light transmitting plate.

In the present invention, the combination of the reflecting finish having the higher reflectance on the rear surface of the light transmitting plate and the reflector having the lower reflectance, and the provision of the prismatic cuts on the front surface of the light transmitting plate increase the luminous energy of the rays of light from the sources of light to the light diffuser and the uniformity in the surface illuminance of the planar illuminating device.

In addition, the provisions of the prismatic sheet and the tapering portion further increase the uniformity in the surface illuminance of the planar illuminating device.

Other objects, features and advantages of the present invention will be apparent from a consideration of the following description, taken in connection with the accompanying drawing.

DETAILED DESCRIPTION OF THE PREFERRED EMBODIMENTS

Preferred embodiments of the present invention will be described with reference to the drawings.

Figure 1:
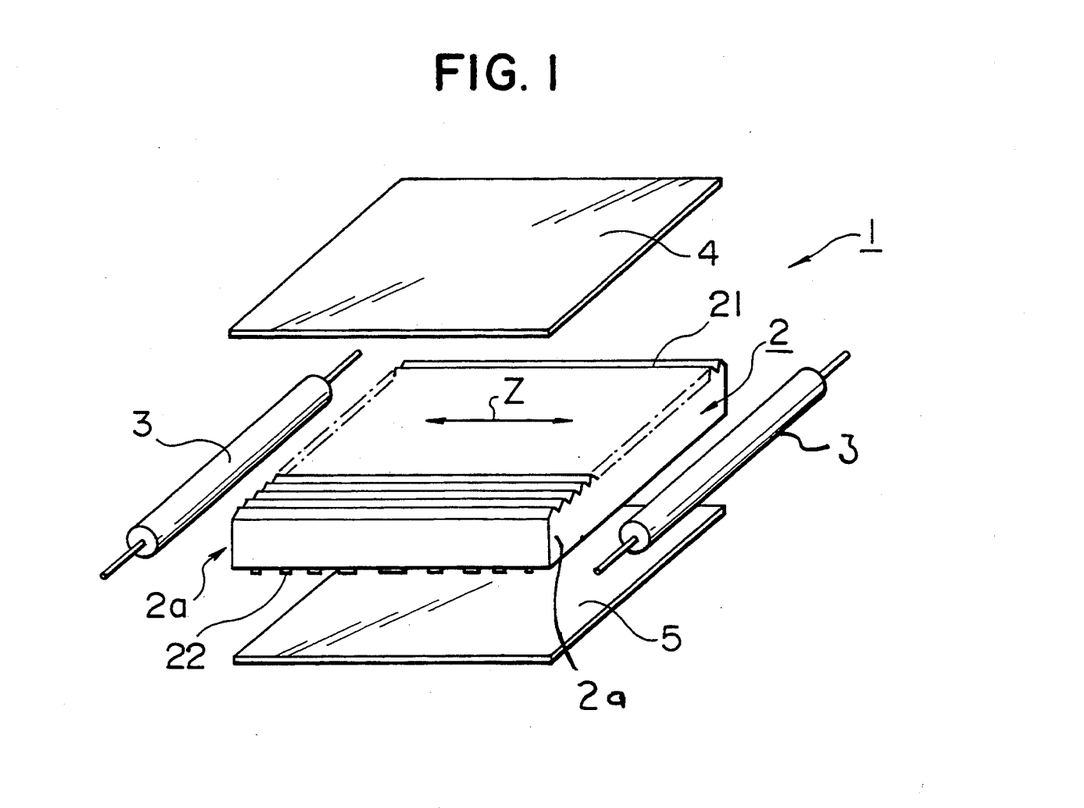
FIG. 1 is an exploded perspective view of a planar illuminating device according to a first embodiment of the present invention.
Figure 2:
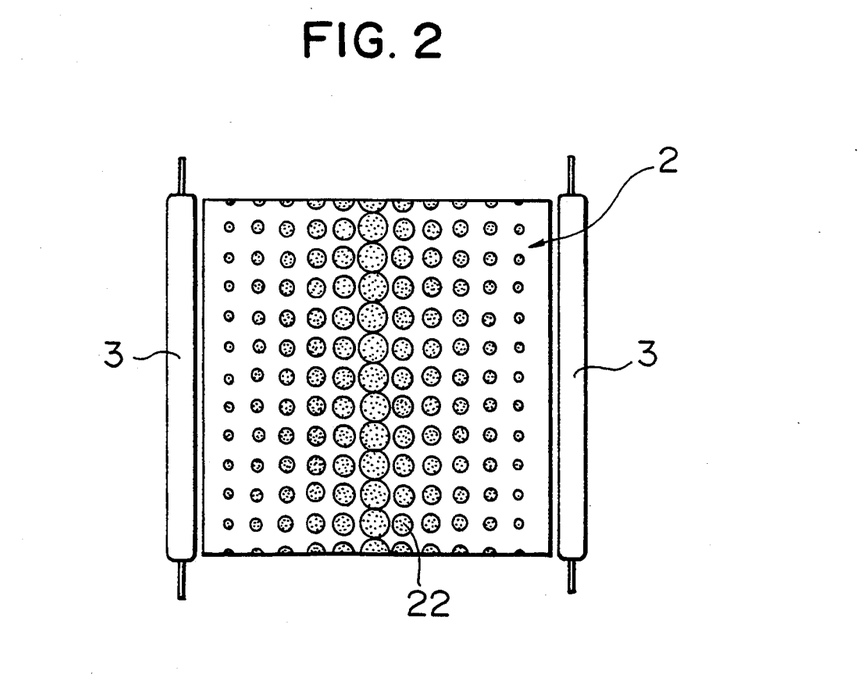
FIG. 2 is a rear elevation of a light transmitting plate of the planar illuminating device of FIG. 1.

FIG. 1 shows a planar illuminating device according to a first embodiment of the present invention. A planar illuminating device 1 comprises a rectangular light transmitting plate 2 of a transparent material such as acrylic resin or polycarbonate, a pair of tubular fluorescent lamps 3, 3 arranged along opposite side edge surfaces 2a, 2a of the light transmitting plate 2, a light diffusing sheet or plate 4 having the same rectangular front surface size as the light transmitting plate 2 and arranged to the front surface of the light transmitting plate 2 with a clearance, and a reflecting sheet 5 having the same rectangular front surface size as the light transmitting plate 2 and arranged relative to the rear surface of the light transmitting plate 2 with a clearance. Air fills the clearance regions. The reflecting sheet 5 has a light reflecting layer made, e.g., of a white paint such as titanium oxide or dioxide or aluminum oxide, or aluminum vapor deposition. The front portion of the light transmitting plate 2 has prismatic cuts 21. The rear surface of the light transmitting plate 2 has a reflecting finish, e.g., an array of spot-shaped light reflecting layers 22 applied directly thereto, as best shown in FIG.2. The arrangement of the light transmitting plate 2 increases both the surface illuminance and the uniformity in the surface illuminance of the diffusing sheet 4.

In detail, each of the prismatic cuts 21 on the front portion of the light transmitting plate 2 has a triangular cross section and extends between the side edge surfaces 2a of the light transmitting plate 2 in the direction of longitudinal axis Z of a prismatic cut transversely to the longitudinal axis of the light transmitting plate 2. The prismatic cuts 21 are arranged close to one another at an equal pitch lengthwise of the light transmitting plate 2 and cover the entire front portion of the light transmitting plate 2 so that the prismatic cuts 21 collectively define a knurled finish or the cross sections of the prismatic cuts 21 are arranged in the form of roulette.

The array of spot-shaped reflecting layers 22 is made, e.g., of a white paint such as titanium oxide or dioxide or aluminum oxide, or aluminum vapor deposition. The array of spot-shaped reflecting layers 22 may alternatively be made of a material of a higher reflectance than reflecting sheet 5. As shown in FIG. 2, the rear surface of the light transmitting plate 2 is provided with reflecting spots 22 of difference sizes. The arrangement of the different size spots is such that the spots further removed from both of the sources of light 3 are of an increased diameter. Alternatively, the density of reflecting spots 22 increases in moving toward the center of the rear surface of the light transmitting plate 2 which is remote from both the sources of light 3. Thus, the array of reflecting spots 22 increases the reflectance of the central of the rear surface of the light transmitting plate 2 at and near the longitudinal axis of the light transmitting plate 2 more so than the reflectance of part near each of the sources of light 3. The reflecting sheet 5 is arranged to the rear surface of the light transmitting plate 2 so as to be in contact with the array of reflecting spots 22.

The operation and advantages of the planar illuminating device 1 according to the first embodiment will be described hereinafter. Since the array of reflecting spots 22 is applied directly to the rear surface of the light transmitting plate 2, the array of reflecting spots 22 reflects all of rays of light arriving thereat at the array. On the other hand, since the reflecting sheet 5 has the small clearance or spacing corresponding to the thickness of the array of reflecting spots 22 with the rear surface of the light transmitting plate 2, only rays of light with a critical angle of incidence or more arriving at the rear surface of the light transmitting plate 2 in contact with the air travel through the light transmitting plate 2 and are reflected by the reflecting sheet 5. Even if the array of reflecting spots 22 is made, e.g., of aluminum vapor deposition and the reflecting sheet 5 has a reflecting layer of the same material as the array of reflecting spots 22, the effective reflectance of the array of reflecting spots 22 is greater than that of the reflecting sheet 5.

The prismatic cuts 21 provide faces constituting an elevation angle to the travel direction of rays of light from the sources of light 3 propagating through the light transmitting plate 2. Since the faces constituting the elevation angle reflect the total rays of light incident upon the faces of the prismatic cuts 21, rays of light totally reflected by the front portion of the light transmitting plate 2 include more component rays of light traveling across the thickness of the light transmitting plate 2 than rays of light totally reflected by the flat front surface of a prior art light transmitting plate do. Rays of light reflected by the array of reflecting spots 22 and the reflecting sheet 5 thus include more component rays of light traveling across the thickness of the light transmitting plate 2, i.e., in the direction of a viewing of an operator of an office automation apparatus comprising the planar illuminating device 1 than rays of light reflected by a reflecting device attached to the rear surface of the prior art light transmitting plate. Consequently, the effective flux-of-light availability of the planar illuminating device 1 is higher than that of the prior art light transmitting plate.

Figure 3:
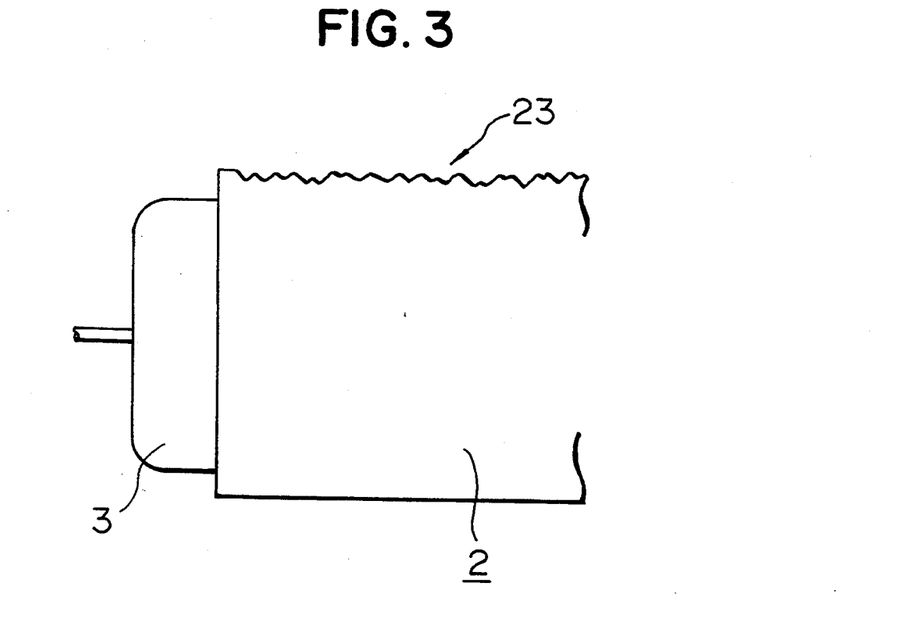
FIG. 3 is a fragmentary longitudinal section of a light transmitting plate of a planar illuminating device according to a second embodiment of the present invention.

In a trial manufacture and a study of the planar illuminating device 1 by the present inventor, the prismatic cuts 21 still advantageously operate even if the pitch of the prismatic cuts 21 is very small. The inventor confirmed that the so-called hairline finish 23 according to a second embodiment of the present invention in which the prismatic cuts 21 constitute an assembly of hairline grooves extending in the direction of the arrow Z and which is illustrated at a very enlarged scale in FIG. 3 is still sufficiently operated. In the first and second embodiments, the rays of light reflected by the array of reflecting spots 22 and the reflecting sheet 5 which travel through the prismatic cuts 21 to the light diffusing sheet 4 are refracted only in a direction transverse to the direction of the arrow Z when traveling through the prismatic cuts 21 and then diffused by the light diffusing sheet 4.

This causes the planar illuminating device 1 to have different angles of illumination in two directions transverse to each other, e.g., the vertical and horizontal directions when the planar illuminating device 1 is in a vertical position in such a manner that the sources of light 3 are right-hand and left-hand. Thus, a liquid crystal display with the planar illuminating device 1 has visual fields of a different extent in the vertical and horizontal directions.

Figure 4:
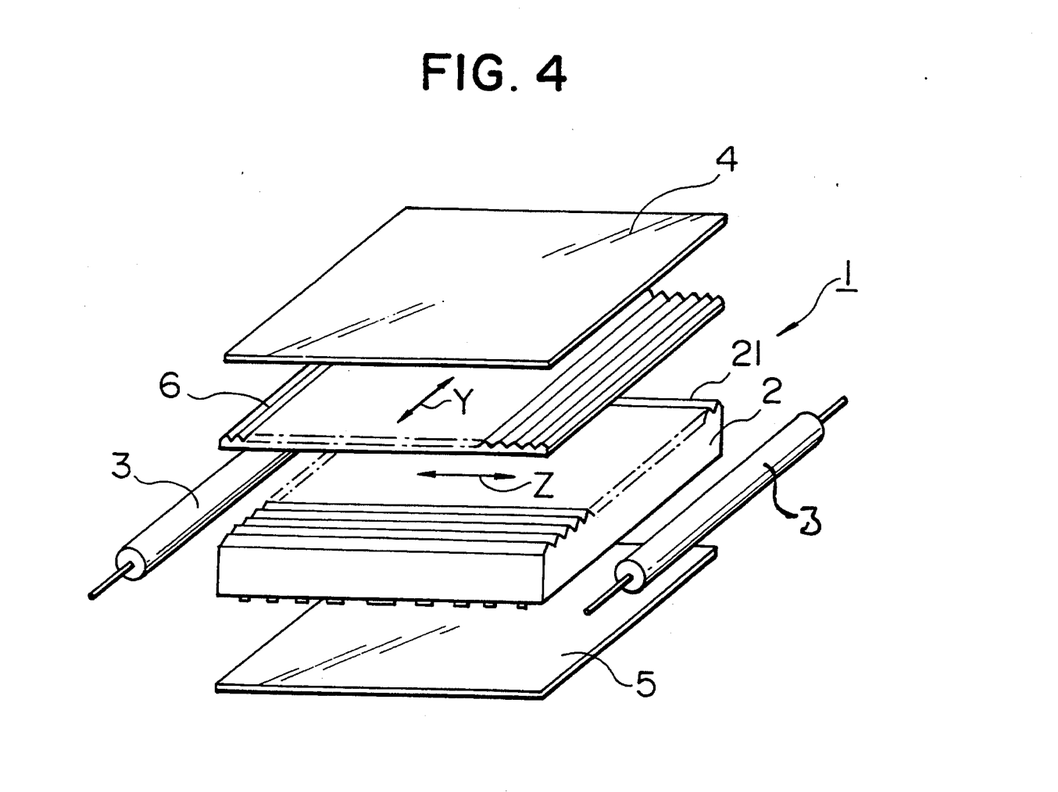
FIG. 4 is an exploded perspective view of a planar illuminating device according to a third embodiment of the present invention.

FIG. 4 shows a planar illuminating device 1 according to a third embodiment of the present invention which is provided in order to improve the anisotropy in the angle of illumination of the illuminating device 1 according to the first and second embodiments. The planar illuminating device 1 according to the third embodiment further provides between the light transmitting plate 2 and the light diffusing sheet 4 a prismatic sheet 6 the front portion of which has substantially the same prismatic cuts as the prismatic cuts 21 but has the axes Y of the prismatic cuts transverse to the axes Z of the prismatic cuts 21. This causes the planar illuminating device 1 according to the third embodiment to have the visual fields of the same extent in the vertical and horizontal directions when the planar illuminating device 1 is in a vertical position in such a manner that the sources of light 3, 3 are right-hand and left-hand. The planar illuminating device 1 according to the third embodiment has the same operations and advantages as the planar illuminating device 1 according to the first and second embodiments except that the former has the visual fields of the same extent in the vertical and horizontal directions. When the prismatic cuts 21 comprise the hairline grooves or cuts 23 as illustrated in the second embodiment, the prismatic cuts of the prismatic sheet 6 likewise comprise the same hairline cuts or grooves.

Figure 5:
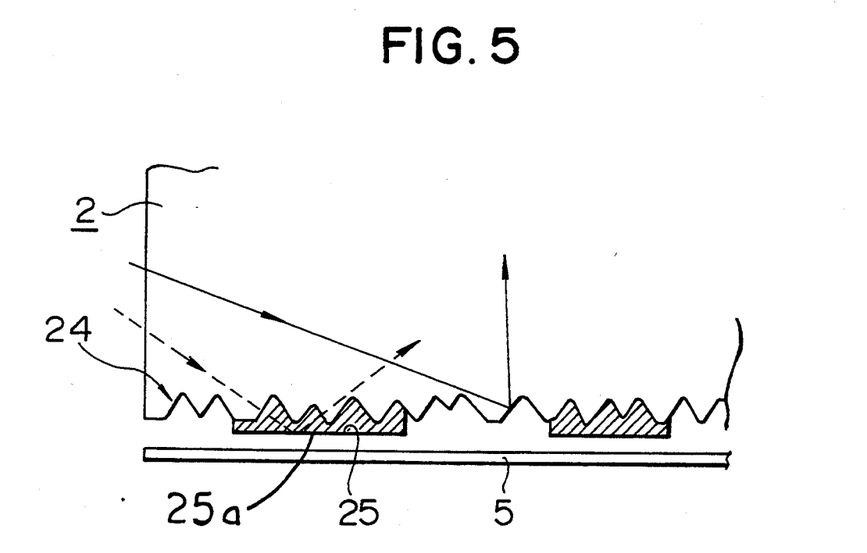
FIG. 5 is a fragmentary longitudinal section of a light transmitting plate of a planar illuminating device according to a fourth embodiment of the present invention.
Figure 5A:
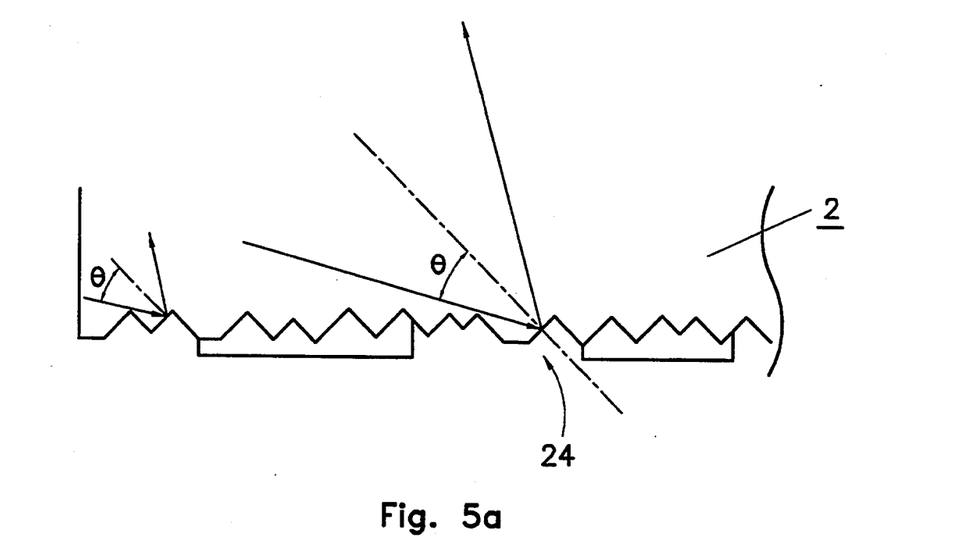
FIGS. 5a and 5b show the manner in which light rays are reflected and refracted by the apparatus of FIG. 5.
Figure 5B:
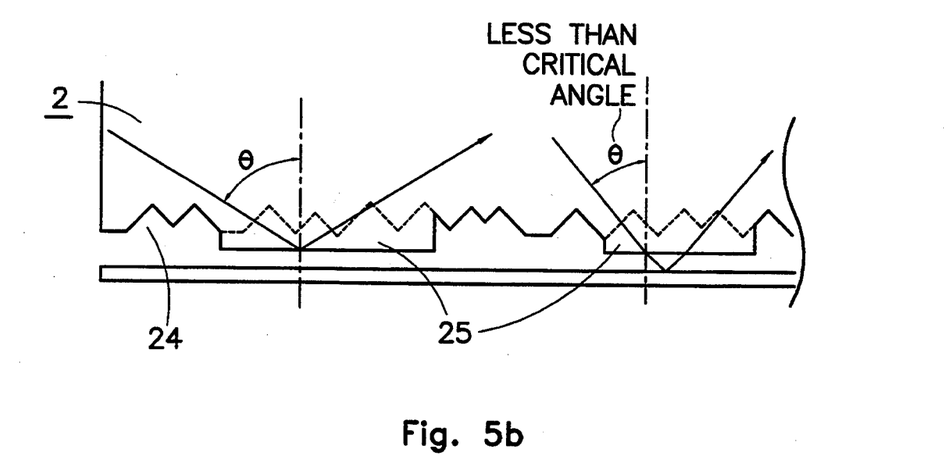

FIG. 5 illustrates a main part of a planar illuminating device according to a fourth embodiment of the present invention and FIGS. 5a and 5b illustrate the manner in which rays are refracted and reflected by the apparatus of FIG. 5. The entire rear portion of the light transmitting plate 2 has a satin finish 24 which comprises minute depressions having suitable shapes such as a concavity or a hemisphere. The satin finish 24 of the light transmitting plate 2 has, e.g., a large number of spot-shaped layers 25 which are made of a transparent paint of substantially the same index of refraction as the light transmitting plate 2 and applied to the satin finish 24. Each spot-shaped layer 25 fully fills depressions of the satin finish 24. The rear surfaces 25a of the spot-shaped layers 25 are flat. The area of a spot-shaped layer 25 is as small as the spot-shaped layer 25 is remote from both the sources of light 3. The reflecting sheet 5 is arranged relative to the rear surface of the light transmitting plate 2 to provide with a narrow clearance between the layers 25 and the front surface of the reflecting sheet 5. Air fills this region.

In the operation of the planar illuminating device according to the fourth embodiment, all of the rays of light emitted from the sources of light 3 to the satin finish 24 through the light transmitting plate 2 are reflected by the surfaces of the minute depressions of the satin finish 24, so that the satin finish 24 has a higher reflectance than the rear surface 25a of each of the spot-shaped layers 25 (see FIG. 5a).

On the other hand, since the rear surfaces 25a of the spot-shaped layers 25 applied to the satin finish 24 are flat, only rays of light incident at the critical angle or less upon the rear surfaces 25a of the spot-shaped layers 25 pass through the spot-shaped layers 25 to the reflecting sheet 5 and are reflected by the reflecting sheet 5, so that the spot-shaped layers 25 have a lower reflectance than the satin finish 24 (see FIG. 5b . Therefore, the occupation ratio between part of the satin finish 24 having no spot-shaped layer 25 and part of the satin finish 24 having a spot-shaped layer 25 is as appropriately varied as these parts are remote from both the sources of light 3 so that the light diffusing sheet 4 has a uniform surface illuminance.

Figure 6:
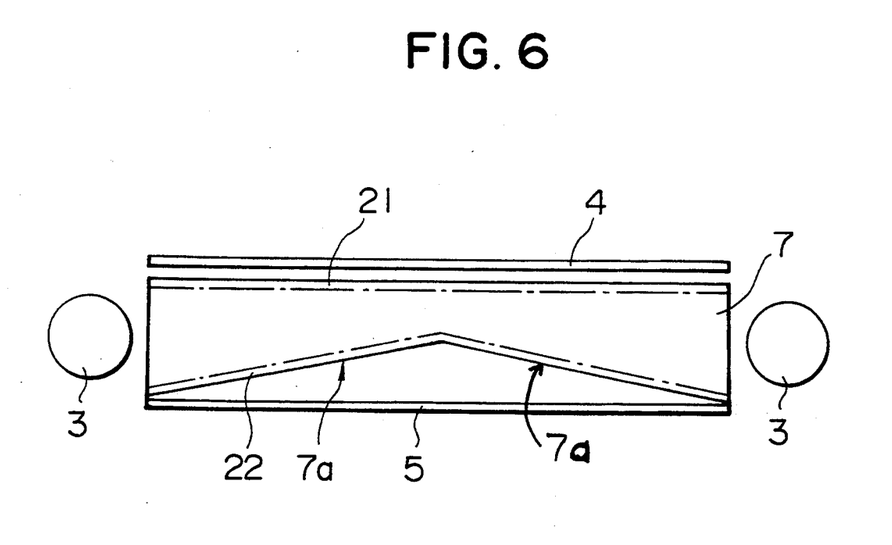
FIG. 6 is a fragmentary cross section of a planar illuminating device according to a fifth embodiment of the present invention.

FIG. 6 illustrates a main part of a planar illuminating device according to a fifth embodiment of the present invention. This planar illuminating device is different from the planar illuminating devices according to the first to fourth embodiments in that the latter comprise the light transmitting plate 2 having the parallel front and rear surfaces but the former comprises a light transmitting plate 7 having a rear portion comprising two tapering portions 7a, 7a tapering in thickness moving away from both sources of light 3, 3 as part of the rear portion of the light transmitting plate 7 is remote from both sources of light 3. The front portion of the light transmitting plate 7 has the prismatic cuts 21 or hairline finish 23. The rear portion of the light transmitting plate 7 has a reflecting finish of an array of reflecting spots 22 or of a combination of the satin finish 24 and the assembly of spot-shaped layers 25.

The planar illuminating device according to the fifth embodiment comprises the flat reflecting sheet 5 adjacent to the rear side edges of the light transmitting plate 7 with a narrow clearance. Air fills the clearance space between the tapering portions 7a and the reflecting sheet 5.

In the operation of the light transmitting plate 7, the tapering portions 7a of the light transmitting plate 7 facilitates the array of reflecting spots 22 or the reflecting assembly of the satin finish 24 and the spot-shaped layers 25 to remarkably increase a reflectance of the planar illuminating device towards the light diffusing sheet 4 to remarkably increase the surface illuminance of the planar illuminating device. In addition, the provision of the tapering portions 7a increases an adjustable range in the surface illuminance of the planar illuminating device by the array of reflecting spots 22 or the satin finish 24 to increase the uniformity of the illuminance of the planar illuminating device.

Each of the planar illuminating devices according to the fourth and fifth embodiments may further comprises the prismatic sheet 6 of the planar illuminating device according to the third embodiment.

The present invention is not rigidly restricted to the embodiments described above. It is to be understood that a person skilled in the art can easily change and modify the present invention without departing from the scope of the invention defined in the appended claims.

What is claimed is:

1. A planar illuminating device, comprising:
a light transmitting plate made of a transparent material and having opposing side edges and a pair of opposing major faces;
two sources of light each arranged adjacent to one of the side edges of said light transmitting plate;
a light reflecting sheet arranged adjacent to one major face of said light transmitting plate, and having a reflecting surface, said reflecting surface of said light reflecting sheet facing in a direction of said light transmitting plate;
a light diffusing sheet adjacent to another one major face of said light transmitting plate for diffusing rays of light emitted from said light transmitting plate;
said one major face being a rear surface of the light transmitting plate;
a reflecting finish applied directly to the rear surface of said light transmitting plate, a reflecting surface of said reflecting finish substantially directing reflected light substantially in a direction toward a front surface of said light transmitting plate, said front surface being said other major face, the reflectance of part of said reflecting finish increasing with increasing distance of said reflecting finish part from at least one of said two sources of light;
parallel prismatic cuts being provided in the front surface of said light transmitting plate, the longitudinal axes of said prismatic cuts being substantially parallel to a direction of an illumination of said source of light into said light transmitting plate; and
said reflecting finish comprising a satin finish on the rear surface of said light transmitting plate, and an assembly of spot-shaped layers made of a transparent paint applied to said satin finish an area of part of said satin finish occupied by a spot-shaped layer comprising spots whose size increase with increasing distance of each spot from at least one of said sources of light.

2. The planar illuminating device as recited in claim 1, wherein said rear surface of said light transmitting plate having a plurality of tapering portions tapering in thickness from the side edges adjacent to said sources of light toward a central region of the light transmitting plate.

3. The planar illuminating device as recited in claim 2, further comprising:
a prismatic sheet made of the same material as said light transmitting plate and arranged between said light transmitting plate and said light diffusing sheet, a front surface of said prismatic sheet having substantially the same prismatic pattern as said front surface of said light transmitting plate, longitudinal axes of prismatic cuts of said prismatic sheet being transverse to longitudinal axes of prismatic cuts of said light transmitting plate.

4. The planar illuminating device as recited in claim 1, further comprising:
a prismatic sheet made of the same material as said light transmitting plate and arranged between said light transmitting plate and said light diffusing sheet, a front surface of said prismatic sheet having substantially the same prismatic pattern as said front surface of said light transmitting plate, longitudinal axes of prismatic cuts of said prismatic sheet being transverse to longitudinal axes of prismatic cuts of said light transmitting plate.

5. A planar illuminating device, comprising:
a light transmitting plate made of a transparent material and having opposing side edges and a pair of opposing major faces;
two sources of light each arranged adjacent to one of the side edges of said light transmitting plate;
a light reflecting sheet arranged adjacent to one major face of said light transmitting plate, and having a reflecting surface, said reflecting surface of said light reflecting sheet facing in a direction of said light transmitting plate;
a light diffusing sheet adjacent to another one major face of said light transmitting plate for diffusing rays of light emitted from said light transmitting plate;
said one major face being a rear surface of the light transmitting plate;
a reflecting finish applied directly to the rear surface of said light transmitting plate, a reflecting surface of said reflecting finish substantially directing reflected light substantially in a direction toward a front surface of said light transmitting plate, said front surface being said other major face, the reflectance of part of said reflecting finish increasing with increasing distance of said reflecting finish part from at least one of said two sources of light;

parallel prismatic cuts being provided in the front surface of said light transmitting plate, the longitudinal axes of said prismatic cuts being substantially parallel to a direction of an illumination of said source of light into said light transmitting plate;

said prismatic cuts collectively forming a knurled finish; and said reflecting finish comprising a satin finish on the rear surface of said light transmitting plate, and an assembly of spot-shaped layers made of a transparent paint applied to said satin finish, an area of part of said satin finish occupied by a spot-shaped layer being spots whose size increase with increasing distance from at least one of said sources of light.

6. The planar illuminating device as recited in claim 5, wherein said rear surface of said light transmitting plate having a plurality of tapering portions tapering in thickness from the side edges adjacent to said sources of light toward a central region of the light transmitting plate.

7. A planar illuminating device, comprising:
a light transmitting plate made of a transparent material and having opposing side edges and a pair of opposing major faces;
two sources of light each arranged adjacent to one of the side edges of said light transmitting plate;
a light reflecting sheet arranged adjacent to one major face of said light transmitting plate, and having a reflecting surface, said reflecting surface of said light reflecting sheet facing in a direction of said light transmitting plate;
a light diffusing sheet adjacent to another one major face of said light transmitting plate for diffusing rays of light emitted from said light transmitting plate;
said one major face being a rear surface of the light transmitting plate;
a reflecting finish applied directly to the rear surface of said light transmitting plate, a reflecting surface of said reflecting finish substantially directing reflected light substantially in a direction toward a front surface of said light transmitting plate, said front surface being said other major face, the reflectance of part of said reflecting finish increasing with increasing distance of said reflecting finish part from at least one of said two sources of light;
parallel prismatic cuts being provided in the front surface of said light transmitting plate, the longitudinal axes of said prismatic cuts being substantially parallel to a direction of an illumination of said source of light into said light transmitting plate;
said prismatic cuts comprising hairline grooves; and
said reflecting finish comprising a satin finish on the rear surface of said light transmitting plate, and an assembly of spot-shaped layers made of a transparent paint applied to said satin finish, an area of part of said satin finish occupied by a spot-shaped layer being spots whose size increase with increasing distance from at least one of said sources of light.

8. The planar illuminating device as recited in claim 7, wherein said rear surface of said light transmitting plate having a plurality of tapering portions tapering in thickness from the side edges adjacent to said sources of light toward a central region of the light transmitting plate.

9. A planar illuminating device, comprising:
a light transmitting plate made of a transparent material and having opposing side edges and a pair of opposing major faces;
two sources of light each arranged adjacent to one of the side edges of said light transmitting plate;
a light reflecting sheet arranged adjacent to one major face of said light transmitting plate, and having a reflecting surface, said reflecting surface of said light reflecting sheet facing in a direction of said light transmitting plate;
a light diffusing sheet adjacent to another one major face of said light transmitting plate for diffusing rays of light emitted from said light transmitting plate;
said one major face being a rear surface of the light transmitting plate;
a reflecting finish applied directly to the rear surface of said light transmitting plate, a reflecting surface of said reflecting finish substantially directing reflected light substantially in a direction toward a front surface of said light transmitting plate, said front surface being said other major face, the reflectance of part of said reflecting finish increasing with increasing distance of said reflecting finish part from at least one of said two sources of light;
parallel prismatic cuts being provided in the front surface of said light transmitting plate, the longitudinal axes of said prismatic cuts being substantially parallel to a direction of an illumination of said sources of light into said light transmitting plate; and
a prismatic sheet made of the same material as said light transmitting plate and arranged between said light transmitting plate and said light diffusing sheet, a front surface of said prismatic sheet having substantially the same prismatic pattern as said front surface of said light transmitting plate, longitudinal axes of prismatic cuts of said prismatic sheet being transverse to longitudinal axes of prismatic cuts of said light transmitting plate.

10. A planar illuminating device, comprising:
a light transmitting plate made of a transparent material and having opposing side edges and a pair of opposing major faces;
two sources of light each arranged adjacent to one of the side edges of said light transmitting plate;
a light reflecting sheet arranged adjacent to one major face of said light transmitting plate, and having a reflecting surface, said reflecting surface of said light reflecting sheet facing in a direction of said light transmitting plate;
a light diffusing sheet adjacent to another one major face of said light transmitting plate for diffusing rays of light emitted from said light transmitting plate;
said one major face being a rear surface of the light transmitting plate;
a reflecting finish applied directly to the rear surface of said light transmitting plate, a reflecting surface of said reflecting finish substantially directing reflected light substantially in a direction toward a front surface of said light transmitting plate, said front surface being said other major face, the reflectance of part of said reflecting finish increasing with increasing distance of said reflecting finish part from at least one of said two sources of light;
parallel prismatic cuts being provided in the front surface of said light transmitting plate, the longitudinal axes of said prismatic cuts being substantially parallel to a direction of an illumination of said source of light into said light transmitting plate;

said reflecting finish comprising an array of spot-shaped reflecting layers applied to the rear surface of said light transmitting plate, the spot-shaped layers having a higher reflectance than said light reflecting sheet, an area of part of the rear surface of said light transmitting plate occupied by a spot-shaped layer being spots of a size which increase with increasing distance of said spots from at least one of said sources of light; and a prismatic sheet made of the same material as said light transmitting plate and arranged between said light transmitting plate and said light diffusing sheet, a front surface of said prismatic sheet having substantially the same prismatic pattern as said front surface of said light transmitting plate, longitudinal axes of prismatic cuts of said prismatic sheet being transverse to longitudinal axes of prismatic cuts of said light transmitting plate.

11. A planar illuminating device, comprising:

a light transmitting plate made of a transparent material and having opposing side edges and a pair of opposing major faces;

two sources of light each arranged adjacent to one of the side edges of said light transmitting plate;

a light reflecting sheet arranged adjacent to one major face of said light transmitting plate, and having a reflecting surface, said reflecting surface of said light reflecting sheet facing in a direction of said light transmitting plate;

a light diffusing sheet adjacent to another one major face of said light transmitting plate for diffusing rays of light emitted from said light transmitting plate;

said one major face being a rear surface of the light transmitting plate;

a reflecting finish applied directly to the rear surface of said light transmitting plate, a reflecting surface of said reflecting finish substantially directing reflected light substantially in a direction toward a front surface of said light transmitting plate, said front surface being said other major face, the reflectance of part of said reflecting finish increasing with increasing distance of said reflecting finish part from at least one of said two sources of light;

parallel prismatic cuts being provided in the front surface of said light transmitting plate, the longitudinal axes of said prismatic cuts being substantially parallel to a direction of an illumination of said source of light into said light transmitting plate;

said reflecting finish comprising an array of spot-shaped reflecting layers applied to the rear surface of said light transmitting plate, the spot-shaped layers having a higher reflectance than said light reflecting sheet, an area of part of the rear surface of said light transmitting plate occupied by a spot-shaped layer being spots of a size which increase with increasing distance of said spots from at least one of said sources of light;

a rear portion of said light transmitting plate having a plurality of tapering portions tapering in thickness from the side edges adjacent to said sources of light toward a central region of the light transmitting plate; and a prismatic sheet made of the same material as said light transmitting plate and arranged between said light transmitting plate and said light diffusing sheet, a front surface of said prismatic sheet having substantially the same prismatic pattern as said front surface of said light transmitting plate, longitudinal axes of prismatic cuts of said prismatic sheet being transverse to longitudinal axes of prismatic cuts of said light transmitting plate.

* * * * *